L. FINKELMAN & J. WILHELM.
CAR FENDER.
APPLICATION FILED SEPT. 13, 1913.
1,106,643.
Patented Aug. 11, 1914.
2 SHEETS—SHEET 2.
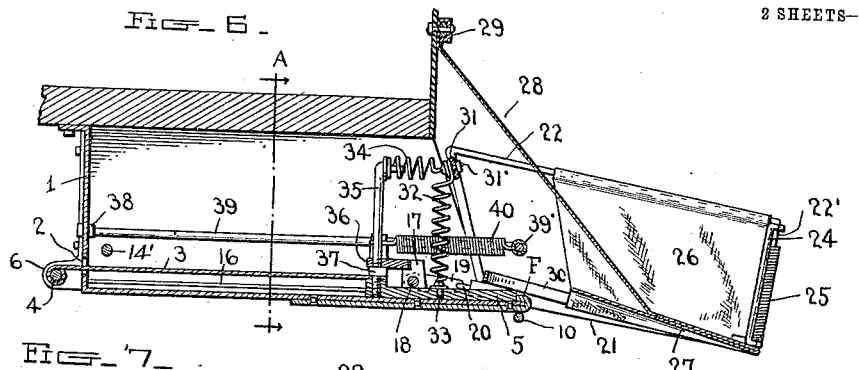
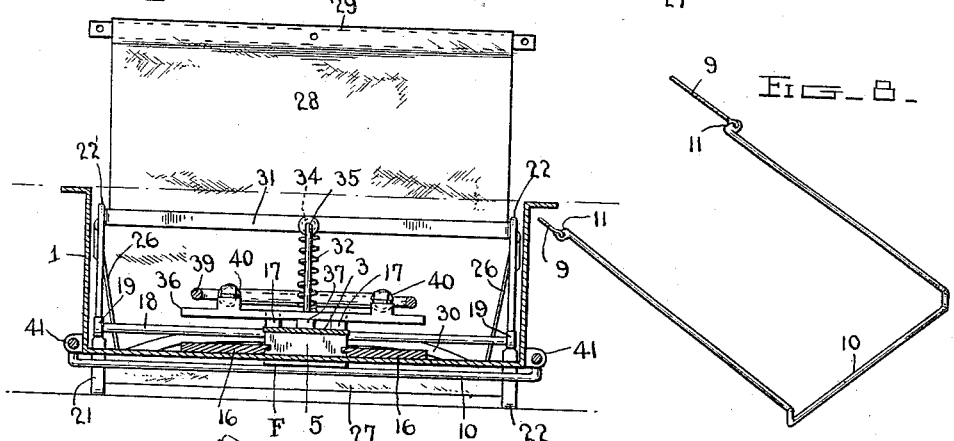
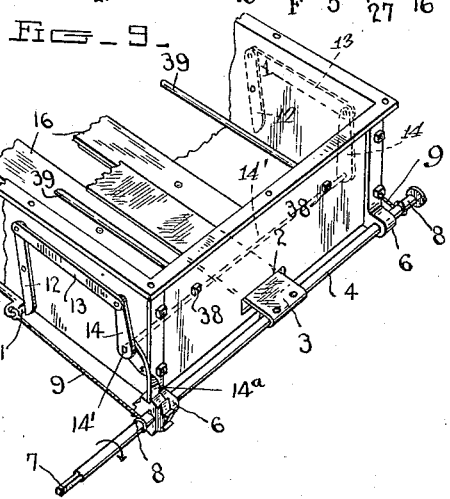
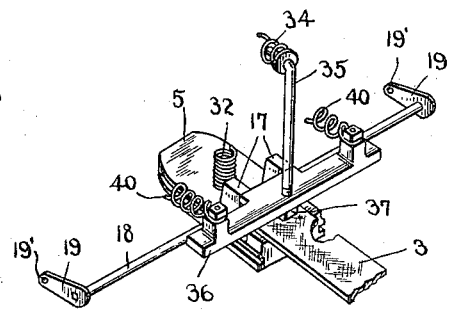
Witnesses
L. B. James
O. M. Avell
Inventor
Louis Finkelman
and
Johannes Wilhelm
By Walter W. Calmore
Attorney
THE NORRIS PETERS CO., PHOTO-LITHO., WASHINGTON, D. C.

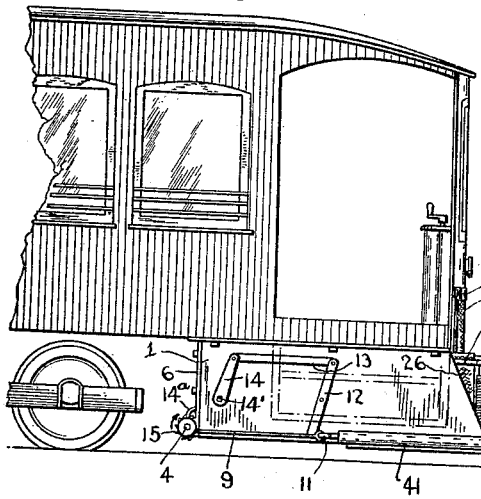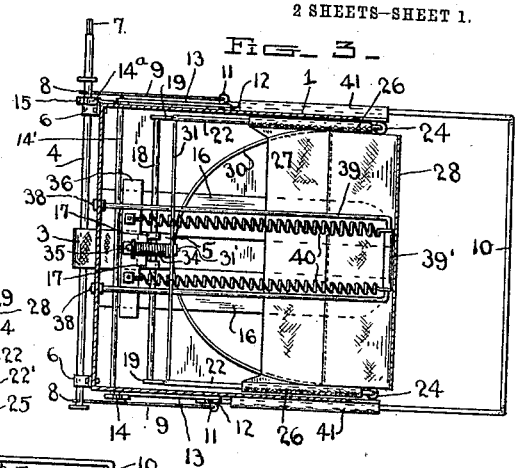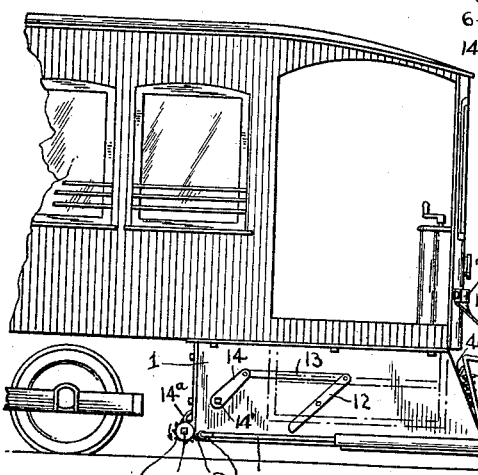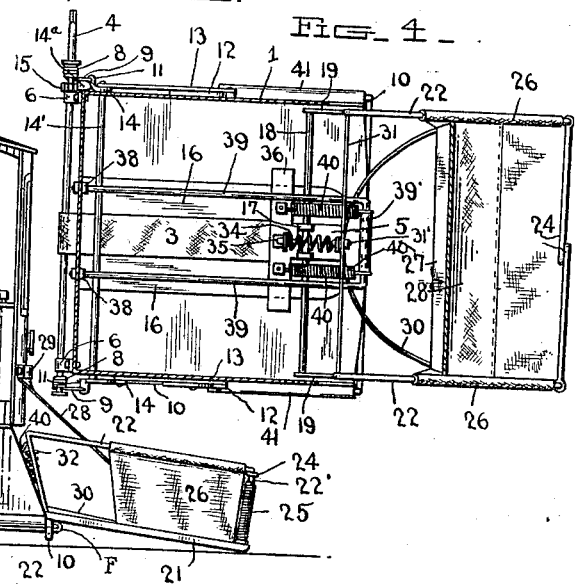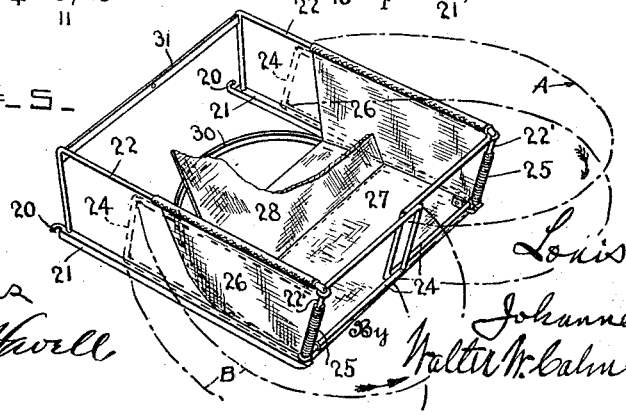

UNITED STATES PATENT OFFICE.

LOUIS FINKELMAN AND JOHANNES WILHELM, OF PHILADELPHIA, PENNSYLVANIA.

CAR-FENDER.

1,106,643.  Specification of Letters Patent.  Patented Aug. 11, 1914.

Application filed September 13, 1913. Serial No. 789,589.

*To all whom it may concern:*

Be it known that we, LOUIS FINKELMAN and JOHANNES WILHELM, subjects of the Czar of Russia, residing at Philadelphia, in the county of Philadelphia and State of Pennsylvania, have invented certain new and useful Improvements in Car-Fenders, of which the following is a specification.

The object of the invention is to provide a fender for cars traveling in crowded cities where the condition of the street traffic is such as not to permit of the use of fenders which normally project in front of the cars.

The fender forming the subject matter of this invention is of the retractile type and is normally confined entirely beneath the car platform and projected automatically in case of emergency.

With these and other objects in view, reference will be had to the accompanying drawings forming a part of this specification and wherein like numerals of reference designate corresponding parts throughout the several views, in which:

Figure 1 is a side elevation of one end of a car with the fender in normal position, Fig. 2 is a similar view with the fender projected, Fig. 3 is a horizontal sectional view taken through Fig. 1 showing the fender retracted, Fig. 4 is a horizontal sectional view taken through Fig. 1 showing the fender projected, Fig. 5 is a perspective view of the scoop portion detached, Fig. 6 is a vertical longitudinal sectional view through Fig. 1, Fig. 7 is a vertical sectional view through line A—A of Fig. 6, Fig. 8 is a perspective view of the trip member, Fig. 9 is a perspective view of the rear end of the fender housing, and Fig. 10 is a perspective view of the scoop carriage detached.

Attached to the under side of the car platform, at either or both ends, is the fender housing 1, which is entirely open at its front end and provided with an opening 2 at its rear end. Extending through this opening 2 is a winding band or belt strap 3, which is attached at one end to the winding shaft 4 and at its other end to the carriage block 5, which latter carries the scoop shown in Fig. 5. The said winding shaft 4 is journaled in brackets 6 at the rear end of the housing 1, and is provided at one end with a squared portion 7 for receiving a crank or other winding means in setting the fender for service. At both ends, the winding shaft 4 extends beyond the sides of the housing and upon these ends as indicated by the numeral 8 in Fig. 9, wind the ends of cords or cables 9 which connect with the ends of the U-shaped trip bar 10, Fig. 8. Both ends of the trip bar 10 are turned outwardly forming shoulders 11, with each of which engages a pawl mechanism. These pawl mechanisms, one of which is provided on each side of the housing, each comprises a centrally pivoted lever 12, having link connection 13 with a lever 14. A shaft 14' extends through the housing and to the projecting ends thereof are secured the said levers 14. On one side only of the housing is provided a pawl 14$^a$, integral with or fast to the lever 14 on the same side of the housing, and the end of this pawl 14 engages with a ratchet wheel 15 which is keyed to the winding shaft 4 and arranged on one side of the housing.

The carriage block 5, referred to and shown in detail in Fig. 10, is grooved on opposite sides forming ways to receive the guide edges of parallel spaced apart tracks 16, as in Fig. 7. These tracks form a part of the bottom of the housing and extend the full length thereof. Journaled in the lugs 17 integral with the carriage block 5 is a rock shaft 18 provided on the forward sides of its ends with rigid crank arms 19, to the eyes 19' of which are connected the hook-ends 20 of the parallel bottom side bars 21 of the fender scoop, seen in Fig. 5.

U-shaped bars 22 constitute the upper side bars of the scoop and their ends are secured to the bottom bars 21. The forward branches of these U-shaped bars 22 form pivot members 22' upon which the gathering-in arms 24 swing, and upon these members 22' are coiled springs 25 for swinging the arms 24 to the position of Fig 5. These arms 24 in the collapsed position of the fender scoop, occupy the position illustrated in dotted lines in Fig. 5, and to an extent seen in Fig. 1, viz; between the top and bottom bars 22 and 21 of the scoop and on the outside of the scoop between the side walls of the housing 1 and the fabric covering 26 of the sides of the scoop. When the scoop is projected, by means to be described, these arms 24 when the scoop reaches the limit of its forward movement, clear the sides of the housing and being released thereby swing as indicated by arrows and dot and dash lines A—B to the position in Fig. 5 thereby gathering in and retaining a person or animal caught in the path of the car.

The bottom of the scoop is of fabric or other suitable material with proper "give" 27, and extending upwardly and attached to the middle portion of the fabric bottom 27 is a fabric backing 28 which at its upper end is attached to the dash of the car at 29. The fabric sides 26 and bottom 27 are one piece and at their junctures are secured to a resilient U-shaped member 30 connected at its forward and free ends with the side members of the scoop so as to hold the same yieldingly held apart and the fabric bottom taut. The rear ends of the scoop sides are connected by cross bar 31 connected with the upper side bars 22. Bolted to this bar 31 by bolt 31' (Fig. 6) extends a coiled spring 32, extending downwardly therefrom and at its lower end being bolted at 33 to the carriage block 5. This spring 32, serves to hold the scoop down upon the bottom of the housing when retracted. The bolt 31' also secures the forward end of a horizontal coiled spring 34 to the bar 31, and the rear end of said spring is connected to a post 35 threaded in the rear end of the carriage block 5. Said post 35 also passes through a cross bar 36 beneath which is a nut 37 between which and the carriage block 5, the said band or belt 3 is clamped.

Extending from the rear wall of the housing 1 and having its ends secured thereto at 38, is a U-shaped member 39, having connected to its front bar portion 39' the forward ends of the main coil springs 40, which shoot the scoop forward out of the housing. The rear ends of these main springs 40 connect with the said bar 36 of the carriage block 5. It will be noted that the side members of the trip bar 10 slidingly pass through guides 41 on the outer portions of the sides of the housing.

In operation, the shaft 4 is rotated to wind the belt or band 3 thereon, at the same time unwinding the cords or cables 9, thereby drawing the scoop into the casing or housing 1 and permitting the trip bar 10 to be advanced as seen in Fig. 1. Before the scoop is let into the housing, the arms 24 are swung from the Fig. 5 position outwardly and around against the outer sides of the scoop sides as seen in dotted lines in Fig. 1, and to an extent shown in full lines in Fig. 1. As the belt or band winds upon the shaft 4, the carriage block 5 is drawn thereby along between the tracks 16 toward the rear wall of the housing 1. During this movement, in which cross bar 36 also participates, being virtually a part of the carriage block 5, the main coil springs are stretched from the Fig. 4 positions to the Fig. 3 positions, placing the scoop parts under tension thereof, so that when released, the scoop will shoot forward from within the housing. The coil spring 34, best seen in Fig. 6, in said view, is in its neutral position, having exerted its pressure upon the scoop bar 31 to tilt the scoop downwardly at its forward end. For this tilting movement, the forward edge of the housing bottom, indicated as F in Fig. 6, serves as the fulcrum, and during this movement the ends 20 of the scoop become elevated thereby raising the forward ends of the crank arms 19 and rocking the bar 18. When the scoop is again being drawn into the housing, the scoop bars 21 rock on said fulcrum F as the front end of the scoop rises and the rear end of the scoop lowers so that the crank arms 19 move downwardly and their forward ends are arrested by the housing bottom; in this position the crank arms 19 slide along the bottom of the housing when the scoop is being drawn into the housing. In other words, the rock shaft 18, crank arms 19, and fulcrum F are instrumental in permitting the scoop to move from its tilted position of Fig. 6 to its housed position of Fig. 1. As the shaft 4 is wound, the pawl 14ª locks the ratchet wheel 15, and as the cord or cable 9 has simultaneously unwound from the shaft 4, the trip bar 10 has been pulled outwardly by the operator to the Fig. 1 position and its shoulders 11 engaged with the trip lever 12 en train with the pawl 14ª. The fender being now set, upon the trip bar 10 engaging an obstacle in the way of the car, it is driven rearwardly, its shoulders 11 forcing the lower end of the trip lever 12 rearwardly and its upper end forwardly, which movement is transmitted by the link 13 to the pawl 14ª, disengaging the same from the ratchet wheel 15, whereupon the main springs 40 pull the scoop parts from their Fig. 3 position to their Fig. 4 position, the arms 24 meanwhile gathering the obstacle into the scoop as described previously.

It is quite obvious that the pawl 14ª may be tripped by the motorman, either by a foot pedal connection therewith or by the ordinary motorman's iron hand bar with hooked end.

Having fully described the invention, what is claimed as new is:—

1. A fender comprising a housing, a scoop movable into and out of same, arms pivoted to the front ends of the scoop and movable from a position across the front of the scoop to a position adjacent the outer faces of the scoop sides.

2. A fender comprising a housing, a scoop movable into and out of same, arms hinged to the scoop and occupying a position against the sides thereof when the scoop is within the housing, said arms being movable from said position to a position across the scoop when the scoop has been projected from the housing.

3. A fender comprising a housing, a scoop movable into and out of same, a winding shaft, a band windable thereon and connected with the scoop, a trip bar, flexible means connected therewith and windable on the shaft oppositely to said band, a ratchet wheel on said shaft and pawl means engageable therewith, said pawl having tripping connection with the trip bar.

4. A fender comprising a housing, a scoop movable into and out of same, a winding shaft, a band windable thereon and connected with the scoop, a trip bar, flexible means connected therewith and windable on the shaft oppositely to said band, a ratchet wheel on said shaft, pawl means engageable therewith, said pawl having tripping connection with the trip bar, and springs connected to the housing and scoop for projecting the latter from the housing.

5. A fender comprising a housing, a scoop movable into and out of same, a shaft, a flexible connection from said scoop and winding on said shaft, a trip member, a flexible connection from the trip member winding on said shaft oppositely to the other flexible connection, ratchet means for locking said shaft and releasable by the trip member, said scoop including a scoop frame and carriage block, hingedly connected spring means for projecting the scoop, and spring means for effecting tilting of the scoop frame relatively to the carriage block.

6. A fender comprising a housing, a scoop movable into and out of same, said scoop comprising a carriage block and scoop frame hinged together, spring means for tilting the scoop frame relatively to the block when projected from the housing, and spring operating means connected to said carriage block and to a part of the housing for projecting the scoop.

7. A fender comprising a housing, a scoop movable into and out of same, said scoop comprising a carriage block and scoop frame hinged together, means for projecting the scoop forwardly, means for arresting forward movement of the block to permit only the scoop frame to be projected from the housing, and spring means between the scoop frame and carriage block to cause the scoop frame to tilt downwardly when so projected.

8. A fender comprising a housing, a guide way therein, a carriage block movable in said guide, a scoop frame having pivotal connection with the carriage block, and adapted to tilt downwardly when projected from the housing, and spring means between the carriage block and scoop frame for so tilting the scoop frame, spring operating means forward of the carriage block and connected thereto and to a part of the housing, a flexible band connected to the carriage block, a winding shaft therefor at the rear end of the housing, a trip member, flexibly connected between the same and adapted to wind on said shaft oppositely to said first flexible connection, and ratchet means for said winding shaft adapted to be tripped by said trip member.

In testimony whereof we affix our signatures in presence of two witnesses.

LOUIS FINKELMAN.
JOHANNES WILHELM.

Witnesses:
GEORGE IMBER,
A. IMBER.

Copies of this patent may be obtained for five cents each, by addressing the "Commissioner of Patents, Washington, D. C."